Patented Feb. 9, 1954

2,668,852

UNITED STATES PATENT OFFICE 2,668,852

NEUTRAL CALCIUM 4-AMINOSALICYLATE HEMIHYDRATE AND PREPARATION OF THE SAME

Alan P. Bentz, Bound Brook, Byron L. West, Plainfield, and Richard J. Turner, Fanwood, N. J., assignors to American Cyanamid Company, New York, N. Y., a corporation of Maine No Drawing. Application December 2, 1952, Serial No. 323,712

3 Claims. (Cl. 260—519)

This invention relates to water-soluble neutral calcium 4-aminosalicylate hemihydrate and its preparation.

The importance and effectiveness of 4-aminosalicylic acid in the treatment of tuberculosis in human beings is well established. Customarily, the drug is given in high doses, about 10 to 20 grams a day, and it was early recognized that such large quantities of an acidic substance might cause complications in the gastrointestinal tract. The sodium salt of 4-aminosalicylic acid has been used in the therapy of tuberculosis with some success. In a disturbingly high percentage of cases, however, the large amounts of sodium thus ingested by the patient cause an upset in the sodium-potassium balance in the body, with attendant undesirable side reactions. Since calcium tends to be excreted readily, rather than accumulating in the body fluids, a calcium salt of 4-aminosalicylic acid is a more desirable form for administration to human beings, and avoids the disadvantages cited above.

It would appear that making the calcium salt of an aromatic carboxylic acid would be a simple matter, obvious to anyone skilled in the art. However, we have found that the presence of an amino group in the 4-position and a hydroxyl group in the 2-position introduce unexpected difficulties into the process. The inherent properties of the calcium salts, the degree of hydration, for example, also make the preparation a difficult problem.

One of the objects of this invention is to manufacture calcium 4-aminosalicylate hemihydrate of high quality which is stable and suitable for drug use.

Since 4-aminosalicylic acid contains two acidic groups, i. e., two hydrogens capable of being replaced by metal cations, both a mono-, or "neutral," and a di-, or "basic" metallic salt are possible. We have prepared two calcium salts of 4-aminosalicylic acid which in their anhydrous states correspond to the formulas below

Neutral salt

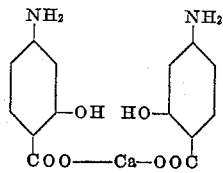

Basic salt

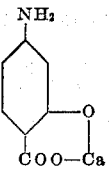

It has been suggested by Roth et al., Helv. Chim. Acta 34, 432 (1951), that the basic salt is a complex ion which may be represented by the structure:

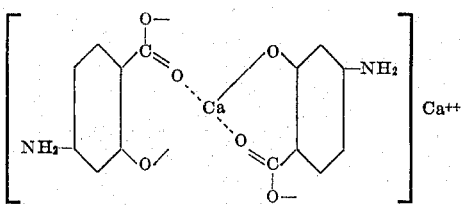

In view of the well-known tendency of orthohydroxy benzoic acids to form such complexes, and the extreme insolubility of the basic salt, the suggested formula has some merit, but it is not possible to say with certainty that it actually has this structure.

It is recognized that two different hydrates of the neutral salt can be prepared under different conditions and both forms have been isolated. When a solution of the neutral calcium salt at 50° C. is cooled to between 0° and 15° C., as is customary for best yields of the neutral salt, the dihydrate is the form most easily isolated due to its solubility properties. Unfortunately, it is metastable, and on storage in powdered form it loses a portion of its water, and forms a sticky mixture of the hemihydrate which decomposes on standing because of the presence of free water. The hemihydrate in the dry state is quite stable over long periods of time, and is soluble to the extent of about 50% in water.

The two forms are theoretically convertible one to the other at the transition temperature which is in the range of 0–15° C. Above the transition temperature, the hemihydrate is theoretically the stable form, with the dihydrate theoretically the stable form below this temperature. Practically, because of the considerably lower water-solubility of the dihydrate, it tends to precipitate both above and below the transition temperature. At temperatures considerably above the transition temperature, the hemihydrate tends to precipitate but extensive losses are incurred because of high solubility of the hemihydrate at such high temperature. Thus, it was considered impractical to isolate the hemihydrate by a direct crystallization procedure from aqueous solution.

We have now discovered a method of obtaining neutral calcium 4-aminosalicylate hemihydrate directly in good yields, without going through the intermediate step of isolating the dihydrate. The desired hemihydrate is obtained directly in our new process by the reaction of calcium chloride with sodium 4-aminosalicylate under controlled conditions of pH, temperature, and concentration. Our process is best illustrated by the following example in which the quantities are expressed as parts by weight unless otherwise specified.

*Example*

A saturated solution of calcium chloride (technical flake) was obtained by dissolving 51 parts (.232 mol) of calcium chloride in 36 parts of water. The pH of the solution so obtained was alkaline to litmus paper. The pH of this solution was adjusted to between 6.0 and 6.5 with hydrochloric acid and one part activated carbon and 0.5 part diatomaceous earth were added. The calcium chloride solution was then filtered hot, cooled to 50° C., and diluted with 15 parts of water.

A second solution was made up by dissolving 84.4 parts (0.48 mol) of sodium 4-aminosalicylate in 92.6 parts of water heating to 40-45° C. This solution was treated with 4 parts activated carbon, 2 parts diatomaceous earth, and sufficient sodium hydrosulfite to give a faint green spot on Vat Yellow G indicator paper. The sodium 4-aminosalicylate solution was then filtered and the temperature adjusted to 45-50° C. The pH of this solution was 7.8.

The sodium 4-aminosalicylate solution was then maintained at 45-50° C. during addition of the concentrated calcium chloride solution. In a plant batch which involves large quantities of calcium and sodium salts, the addition will require from about 20 to 30 minutes and crystallization will begin when approximately one-half of the calcium chloride has been added. The stirring was continued for 30 minutes at 45-50° C. after the last of the calcium chloride was added and the resulting slurry filtered. The neutral calcium 4-aminosalicylate hemihydrate so obtained was contaminated with chloride ions and was washed with a saturated calcium 4-aminosalicylate solution until the test for chloride was negative. The amount of wash solution required to eliminate chloride was about 50% by weight of the crystalline hemihydrate. The wash solution may be conveniently prepared as follows:

A slurry of 54.5 parts calcium carbonate, 80.0 parts water and 16.7 parts of 4-aminosalicylic acid was stirred at 45° C. until all carbon dioxide evolution ceased. The mixture was made up to 100 parts by volume, and 4 parts of activated carbon and 2 parts diatomaceous earth added. Sufficient sodium hydrosulfite is added to give a faint green spot on Vat Yellow G indicator paper and the solution was filtered. The wash solution so obtained should be kept under nitrogen if not used at once.

The neutral calcium 4-aminosalicylate hemihydrate after removal of chloride, is further washed with isopropanol and air dried at room temperature until the moisture, by Karl Fisher, is between 2.5 and 3%. The yield was approximately 77%.

It is important to control the pH during the reaction within the range of 6-7. A higher pH will cause darkening of the product and turbidity. If the pH is appreciably lower, 4-aminosalicylic acid will be precipitated. Temperature control between 45° and 50° C. is also critical for formation of the hemihydrate to the exclusion of trihydrate.

The optical and crystallographic properties of the dihydrate and the hemihydrate are distinct and different. The two are readily converted one into the other, indicating that the difference between the two crystalline modifications is degree of hydration. The dihydrate of neutral calcium 4-aminosalicylate occurs in the form of hexagonal plates, while the hemihydrate occurs as elongate prisms. The optical and crystallographic properties are given below:

| | Hemihydrate | Dihydrate |
|---|---|---|
| Morphology | Elongate prisms | Hexagonal plates. |
| Silhouette angle | | 110° ±. |
| Extinction | Parallel and oblique | Symmetrical. |
| Optical orientation | One isogyre | Bxo ⊥ plates. |
| Refractive indices | $n\beta=1.635$ $ns=1.85$ | $n\alpha=1.43$. $n\beta=1.655$. |
| Optical character | (+) | (−) |

The new compound neutral calcium 4-aminosalicylate hemihydrate is not claimed in the present application, since it is described and claimed in the copending application of Germann and Smith, Serial No. 263,514, filed December 26, 1951.

We claim:

1. A process for the manufacture of neutral calcium 4-aminosalicylate hemihydrate which comprises mixing with agitation at 45-50° C. a concentrated solution of one mol calcium chloride having a pH between 6.0 and 6.5 and a saturated solution of about two mols sodium 4-aminosalicylate, maintaining the reaction mixture at 45-50° C. until reaction is complete, and separating the neutral calcium 4-aminosalicylate hemihydrate.

2. A process according to claim 1 in which the neutral calcium 4-aminosalicylate hemihydrate is washed free of chloride with a saturated solution of neutral calcium 4-aminosalicylate.

3. A process according to claim 2 in which the neutral calcium 4-aminosalicylate hemihydrate is washed with isopropanol.

ALAN P. BENTZ.
BYRON L. WEST.
RICHARD J. TURNER.

No references cited.